(12) United States Patent
Shin et al.

(10) Patent No.: US 6,748,235 B1
(45) Date of Patent: Jun. 8, 2004

(54) POWER CONTROL DURING A TRANSMISSION PAUSE

(75) Inventors: Sung-Hyuk Shin, Fort Lee, NJ (US); Ariela Zeira, Huntington, NY (US); Faith Ozluturk, Port Washington, NY (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/325,772

(22) Filed: Dec. 19, 2002

Related U.S. Application Data
(60) Provisional application No. 60/425,607, filed on Nov. 12, 2002.

(51) Int. Cl.⁷ .............................. H04Q 7/20; H04B 7/60
(52) U.S. Cl. ............................ 455/522; 455/68; 455/69
(58) Field of Search .......................... 455/68, 69, 522, 455/504, 500, 432.1, 436, 442, 438, 439

(56) References Cited

U.S. PATENT DOCUMENTS

| | | | |
|---|---|---|---|
| 5,940,743 A | * 8/1999 | Sunay et al. ................. 455/69 |
| 6,175,586 B1 | * 1/2001 | Lomp ........................ 375/130 |
| 6,418,320 B2 | * 7/2002 | Yoshida et al. ............. 455/522 |
| 6,449,462 B1 | * 9/2002 | Gunnarsson et al. ..... 455/67.13 |

* cited by examiner

Primary Examiner—Nay Maung
Assistant Examiner—Edan Orgad
(74) Attorney, Agent, or Firm—Volpe and Koenig, P.C.

(57) ABSTRACT

A transmitting station performs closed loop power control prior to a transmission pause. A closed loop transmission power level prior to the pause is determined. A reference signal is received and a received power level of the reference signal prior to and during the transmission pause is determined. The measured reference signal received power levels are compared to a transmit power level of the reference signals to produce a pathloss estimate of the reference signal prior to and during the transmission pause. A new transmit power level is determined by adjusting the closed loop transmission power level by a change between the prior to and during pathloss estimates. A transmission power level of the transmitting station is set to the determined new transmit power level. A communication is transmitted at the set transmission power level.

5 Claims, 2 Drawing Sheets

POWER CONTROL DURING A TRANSMISSION PAUSE

CROSS REFERENCE TO RELATED APPLICATION(S)

This application claims priority from U.S. provisional application No. 60/425,607 filed Nov. 12, 2002 which is incorporated by reference as if fully set forth.

BACKGROUND

This invention generally relates to spread spectrum communication systems. More particularly, the present invention relates to controlling transmission power levels in such systems.

In many spread spectrum communication systems, multiple user communications are sent over a shared frequency spectrum. In code division multiple access (CDMA) communication systems, the multiple communications are sent using different codes to distinguish them. In time division duplex (TDD)/CDMA and time division synchronous CDMA (TD-SCDMA) communication systems, the spectrum is also time divided to better utilize the spectrum.

Since multiple communications are sent in the same spectrum, the communications may interfere with each other. To reduce the interference that the communications induce on one another, adaptive power control is used. The purpose of adaptive power control is to transmit each communication at a minimum power level to achieve a specified reception quality, such as a target signal to interference ratio (SIR).

One scheme to implement adaptive power control is closed loop power control. In closed loop power control, a transmitter transmits a communication at a certain power level. A target receiver receives the communication and measures the SIR of the received signal. The measured SIR is compared to a target SIR. If the measured SIR is larger than the target SIR, a power command indicating that the transmitter should decrease its transmission power is sent. If the measured SIR is less than the target SIR, a power command indicating that the transmitter should increase its power level is sent. The power command is, typically, a single bit indicating either an increase or decrease in power level. The transmitter receives the power command and changes its transmission power level in response to the power command by a fixed amount, such as by increasing or decreasing the transmission power level by 1 dB.

When there is a pause in the transmissions, no data is present in the channel for SIR calculations. In this situation, the receiver may generate either no power commands or dummy power commands. The dummy commands are arbitrary commands and most likely have no relation to any actual change in channel conditions. Likewise, when there is a pause in the receiver's transmissions, no power commands are sent to the transmitter. Since the channel conditions may change during these pauses, the transmission power level may deviate from the desired power level for the current channel conditions. If the power level is too low, a desired quality of service (QOS) may not be achieved. If the power level is too high, unnecessary interference may be introduced onto other users.

Accordingly, it is desirable to have other approaches to power control.

SUMMARY

A transmitting station of the present invention performs closed loop power control prior to a transmission pause and determines the closed loop transmission power level. A reference signal is received and a received power level of the reference signal prior to and during the transmission pause is determined. The measured reference signal received power levels are compared to a transmit power level of the reference signals to produce a pathloss estimate of the reference signal prior to and during the transmission pause. A new transmit power level is determined by adjusting the closed loop transmission power level by a change between the prior to and during pathloss estimates. A transmission power level of the transmitting station is set to the determined new transmit power level. A communication is transmitted at the set transmission power level.

BRIEF DESCRIPTION OF THE DRAWING(S)

DETAILED DESCRIPTION OF THE PREFERRED EMBODIMENT(S)

The present invention will be described with respect to the figures wherein like numerals represent like elements throughout. Although power control during a transmission pause is explained with the preferred TDD/CDMA and TD-SCDMA communication systems, it can be applied to other communication systems experiencing channel reciprocity between the uplink and downlink.

Figure 1:
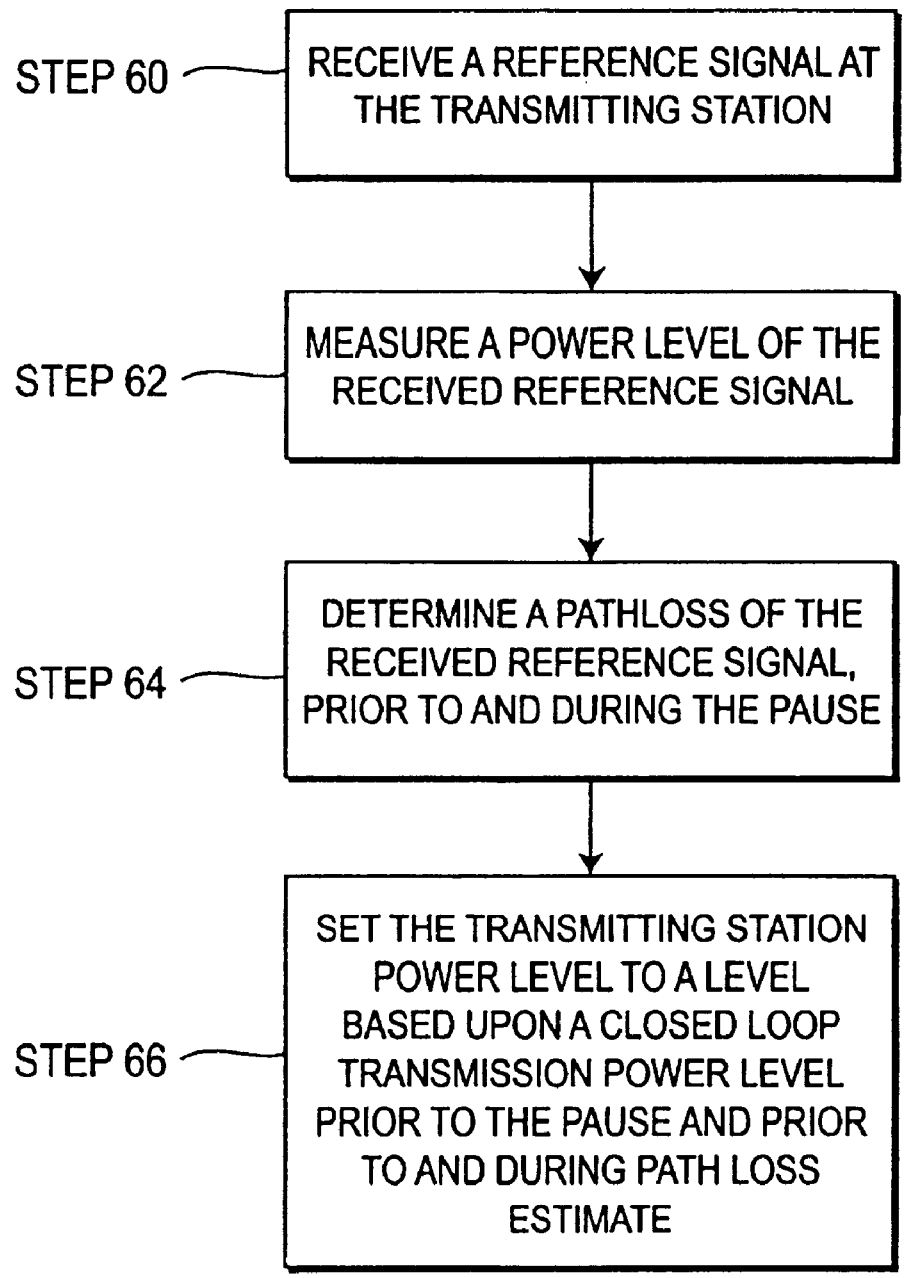
FIG. 1 is a flow chart of an embodiment of power control during a transmission pause.
Figure 2:
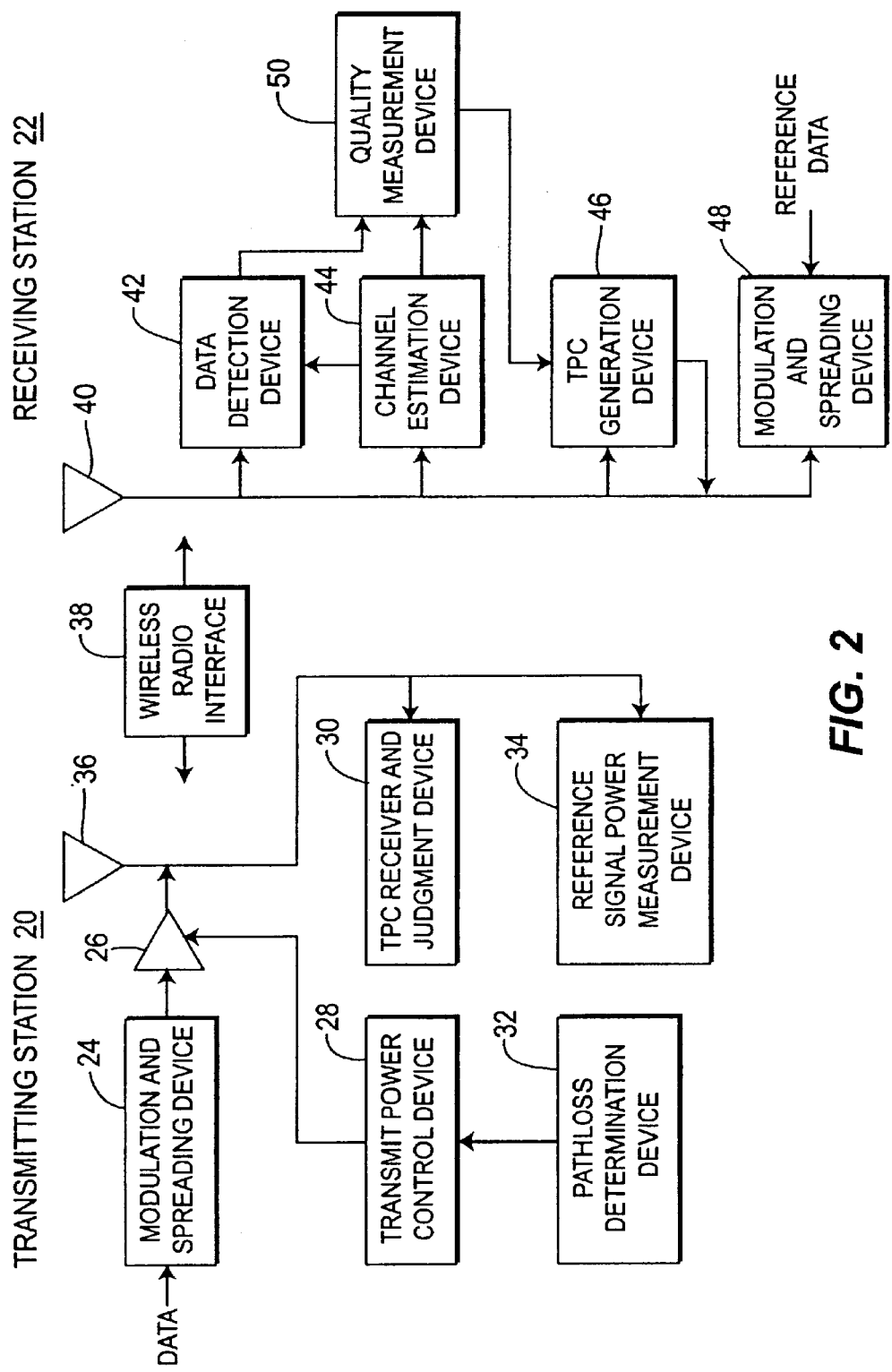
FIG. 2 is a simplified block diagram of a transmitting and receiving station using power control during a transmission pause.

A preferred embodiment of power control during a transmission pause is explained using the flow chart of FIG. 1 and the components of two simplified communication stations of FIG. 2. For the following discussion, the communication station having its transmission power level controlled is referred to as the transmitting station 20 and the communication station receiving the power controlled communications is referred to as the receiving station 22. Since power control during a transmission pause can be used for uplink, downlink or both types of communications, the transmitting station 20 may be a base station, a user equipment or both.

When data is transmitted by the transmitting station 20, data to be transmitted to the receiving station 22 is modulated and spread to produce a spread spectrum radio frequency (RF) signal by a modulation and spreading device 24. An amplifier 26 is used to control the power level of the RF signal. The RF signal is radiated by an antenna 36 or antenna array through a wireless radio interface 38 to the receiving station 22.

The RF signal is received by an antenna 40 or antenna array of the receiving station 22. The impulse response of the received signal is estimated by a channel estimation device 44. In a TDD/CDMA or TD-SCDMA communication system, the channel estimation is performed using known training sequences in a midamble portion of a communication burst. Using the impulse responses, the data detection device 42 recovers the transmitted data from the received RF signal. Using information from both the data detection device 42 and the channel estimation device 44, a quality of the received RF signal, such as a SIR, is measured by a quality measurement device 50. A transmit power command (TPC) generation device compares the measured quality to a target quality. If the measured quality is greater than the target, a decrease command is generated. If the measured quality is less than or equal to the target, an increase command is generated. Although other commands may be used, the preferred command is a single bit with a +1 indicating an increase in power level and a −1 indicating a decrease in power level. The TPC is sent to the transmitting station 20. If the transmitting station 20 is not transmitting, the receiving station 22 may send no TPCs to the transmitting station 20 or dummy (arbitrary) TPCs. If the receiving station 22 has paused its transmissions, no TPCs are transmitted to the transmitting station 20 during the pause.

To compensate for the lack of TPCs, whether due to a pause in the transmitting or receiving station's transmissions, a pathloss estimate is used where the pathloss estimate includes all radio channel conditions between the transmitting and receiving stations, such as fast fading, slow fading and long-term fading. At the receiving station 22, reference data is modulated and spread by a modulation and spreading device 48 to produce a reference RF signal. The reference RF signal is radiated by the antenna 40 or antenna array to the transmitting station 20 through the wireless radio interface 38, (step 64). For uplink power control for a third generation partnership project 3GPP TDD/CDMA system, the preferred reference channel is the primary common control physical channel (P-CCPCH), the secondary common control physical channel (S-CCPCH), or the forward access channel (FACH). This invention can use as a reference channel any physical channel with known transmit power.

The transmitting station 20 receives the reference signal using its antenna 36 or antenna array, (step 60). A reference signal power measurement device 34 measures the power level of the received reference signal, (step 62). Using the measured reference signal power, a pathloss determination device 32 determines the pathloss for the reference signal, (step 64). The transmission power level of the reference signal may be known a priori by the transmitting station 20, or maybe signaled to the transmitting station 20, such as by using a broadcast channel (BCH). The pathloss is determined by subtracting the received power level from the transmitted power level.

When there are no pauses in transmission from either the transmitting station 20 or receiving station 22, the transmit power control device 28 determines the transmit power level using a closed loop algorithm. The TPC is received by a TPC receive and judgment device 30 and the value of the TPC is determined. Using the determined value for the TPC, the transmission power level is either increased or decreased by the transmit power control device 28 by a fixed amount, such as 1 dB. The transmit power control device 28 sets the power level of the transmitted RF signal by adjusting a gain of the amplifier 26. When there is a pause in transmission of the dedicated channel from either the transmitting station 20 or the receiving station 22, the transmission power level is set using the closed loop transmission power level prior to the pause, a pathloss estimate prior to the pause and a recent path loss estimate derived from a reference signal, (step 66). The common channel (P-CCPCH) is always sent.

When the receiving station 22 pauses its transmissions which carry the transmit power commands (TPCs), the transmit power control device 28 ignores any dummy TPCs which may be generated by the receiver. One method for determining the transmission power level of the transmitting station 20 for either a TDD/CDMA or TD-SCDMA communication system is set forth in Equation 1.

$$P(k)=P_{beforeDTX}+L_{beforeDTX}-L(k); \quad \text{Equation 1}$$

where $P(k)$ is the transmission power level in dBm in the $k^{th}$ frame or sub-frame in the pause; $P_{beforeDTX}$ is the transmission power in dBm in the last frame before the pause (the discontinued transmission); $L_{beforeDTX}$ is the pathloss in dB in the last frame or sub-frame before the pause; and $L(k)$ is the pathloss in dB in the $k^{th}$ frame or sub-frame during the pause.

The change in pathloss, $L_{beforeDTX}-L(k)$, is an indication of the change in the channel conditions. By adjusting the power level just prior to the pause by the change in pathloss, the new transmission power level compensates for the changes in the channel conditions.

Alternately, Equation 1 can be expressed such as per Equation 2:

$$P(k)=P(k-1)+L(k-1)-L(k); \quad \text{Equation 2}$$

where $P(k-1)$ is the transmission power level in dBm in the $(k-1)$th fram or sub-frame in the pause; $L(k-1)$ is the pathloss in dB in the $(k-1)$th frame or sub-frame during the pause.

Preferably, to better reflect the quality of the pathloss estimates, the pathloss estimates are weighted against a long term pathloss estimate, $L_O$ to produce a weighted pathloss. As time passes, the accuracy of the most current estimate diminishes and the long term pathloss $L_0$ becomes a better estimate of the true pathloss. As the most current pathloss estimate becomes stale, the long term pathloss is given more weight. An example of weighted pathloss and can be seen in Equation 3:

$$L_w(k)=\alpha L(k)+(1-\alpha)L_O; \quad \text{Equation 3}$$

where $L_w(k)$ is the weighted pathloss in dB in the kth frame or sub-frame during the pause; $L(k)$ is the pathloss in dB in the $k^{th}$ frame or sub-frame during the pause; $L_O$ is the long term pathloss; and $\alpha$ is a weighting factor which is $0<=\alpha<=1$. For time slot based communication systems, such as TDD/CDMA and TD-SCDMA, $\alpha$ is based on the number of time slots, $\Delta TS$, between the time that the pathloss in the last frame or sub-frame before the pause was estimated and the time that the pathloss in the $k^{th}$ frame or sub-frame during the pause is estimated, such as per Equation 4:

$$\alpha = \exp\left(-\frac{\Delta TS}{C}\right); \quad \text{Equation 4}$$

where C is the constant representing the degree of a weighting.

The preferred equation for determining the transmission power level for either a TDD/CDMA or TD-SCDMA communication system, when there is a pause in transmission from the transmitting station 20 is illustrated by Equation 5:.

$$P_{afterDTX}=P_{beforeDTX}+L_{beforeDTX}-L_{lastDTX}; \quad \text{Equation 5}$$

where $P_{afterDTX}$ is the initial transmission power level in dBm after the pause. $P_{beforeDTX}$ is the transmission power in dBm in the last frame before the pause. $L_{beforeDTX}$ is the pathloss in dB in the last frame or sub-frame before the pause. $L_{lastDTX}$ is the pathloss in dB in the last frame during the pause. In this case, the transmit power control device 28 ignores any dummy TPCs it receives.

To better reflect the quality of the pathloss estimates, preferably, the pathloss estimates are weighted against a long term pathloss estimate $L_0$ such as per Equation 2.

What is claimed is:

1. A method for controlling transmission power levels of a transmitter station during a transmission pause, the method comprising:

performing closed loop power control prior to the transmission pause;

determining a closed loop transmission power level prior to the pause;

receiving a reference signal and measuring a received power level of the reference signal prior to and during the transmission pause;

comparing the measured reference signal received power levels to a transmit power level of the reference signals to produce a pathloss estimate of the reference signal prior to and during the transmission pause;

determining a new transmit power level by adjusting the closed loop transmission power level by a change between the prior to and during pathloss estimates;

setting a transmission power level of the transmitting station to the determined new transmit power level; and transmitting a communication at the set transmission power level.

2. The method of claim 1 wherein the transmission pause is due to a pause in transmissions from the transmitting station.

3. The method of claim 1 wherein the transmission pause is due to a pause in transmissions from the receiving station.

4. The method of claim 1 wherein the new transmit power level is determined by adjusting the closed loop transmission power level by a change between the prior to and long term pathloss estimates.

5. The method of claim 1 wherein the new transmit power level is determined by adjusting the closed loop transmission power level by a change between the prior to and a weighted average of long term and during pathloss estimates.

* * * * *

UNITED STATES PATENT AND TRADEMARK OFFICE
CERTIFICATE OF CORRECTION

PATENT NO.    : 6,748,235 B1  Page 1 of 1
DATED         : June 8, 2004
INVENTOR(S)   : Shin et al.

It is certified that error appears in the above-identified patent and that said Letters Patent is hereby corrected as shown below:

<u>Title page,</u>
Item [75], Inventors, delete "Faith" and insert -- Fatih --.

Signed and Sealed this

Thirteenth Day of June, 2006

JON W. DUDAS
*Director of the United States Patent and Trademark Office*